UNITED STATES PATENT OFFICE.

DAVID R. BROWNLOW AND GEORGE W. FRANCIS, OF MIDDLETOWN, CONN.

IMPROVEMENT IN COMPOUNDS FOR COATING IRON AND OTHER METALS.

Specification forming part of Letters Patent No. 165,658, dated July 20, 1875; application filed December 29, 1874.

*To all whom it may concern:*

Be it known that we, DAVID R. BROWNLOW and GEORGE W. FRANCIS, both of Middletown, in the county of Middlesex and State of Connecticut, have invented an Improved Coating for Iron and other Metals, of which the following is a specification:

Our invention consists in an adhering coating for iron and other metals, composed of the ordinary slag from an iron furnace or its equivalent and borax, or other equivalent flux, by means of which the metal is perfectly protected from the action of the air or of moisture, and so that the metal can be subjected to a high degree of heat without injury to itself or the said coating.

In carrying out our invention, when it is desired to form a coating for wrought-iron, we take of ordinary slag produced by an iron furnace, one part, by weight, and of borax seven parts. We place them in a suitable vessel or retort, and by the application of heat to the required degree—say, between 2,000° and 3,000° Fahrenheit—reduce them to a fluid condition. We then remove any impurities which may have existed in the slag, which will rise to the surface of the fluid mass. We then thoroughly cleanse and deoxidize the surface of the iron either by an acid bath or otherwise, and then plunge the iron into the fluid, so that it is entirely immersed therein.

The temperature of the mass, when thus melted, will act to bring the surface of the iron being coated to the point at which a perfect union and cohesion of the particles of the surface of the iron and the particles of the mass take place; and the iron should remain immersed until the required coating by the fluid shall have been effected. This result will be secured by allowing the iron to remain in the fluid about two minutes.

The iron thus treated should then be taken out, and any surplus of the fluid being permitted to drip off; but that which remains upon the iron should be allowed to cool and harden, when the coating is completed.

In coating cast-iron or metals other than wrought-iron it is necessary to increase or decrease, as the case may be, the proportion of borax to the slag to such an extent as will enable the slag to be kept in a fluid state at such a temperature as that, while such temperature will act to bring the surface of the metal just to the point to cause the union between the fluid and the surface of the metal to be effected, as hereinbefore stated, the heat of the fluid will not act to fuse the metal on its being immersed in the fluid.

When the slag of an iron-furnace cannot be readily obtained the equivalent thereto for this coating may be obtained by taking equal parts, by weight, of sulphuret of iron, arsenic, and plumbago, and by adding to one part of these, by weight, seven parts of borax, and, proceeding as hereinbefore set forth, the coating will be formed.

Any desired color may be given to the coating by the addition to the composition of the proper coloring matter.

It is not our intention to claim in this patent any articles of manufacture formed of iron or other metals, and coated with the composition of slag and borax, as herein described, reserving the same for a distinct and separate application, which we intend hereafter to make.

What we claim as our invention, and desire to secure by Letters Patent, is—

A compound for coating iron and other metals, consisting of slag and borax, substantially as described.

DAVID R. BROWNLOW.
GEORGE W. FRANCIS.

Witnesses:
D. WARD NORTHROP,
A. B. CALEF.